United States Patent [19]

Hartmann

[11] Patent Number: 4,533,530

[45] Date of Patent: Aug. 6, 1985

[54] PROCESS FOR THE SEPARATION OF VOLATILE CHLORINE COMPOUNDS FROM THE EXHAUST GASES RESULTING FROM THE CHLORINATION OF TITANIUM-CONTAINING RAW MATERIALS

[75] Inventor: Achim Hartmann, Pulheim, Fed. Rep. of Germany

[73] Assignee: Kronos Titan, GmbH, Fed. Rep. of Germany

[21] Appl. No.: 639,215

[22] Filed: Aug. 9, 1984

[30] Foreign Application Priority Data

Aug. 9, 1983 [DE] Fed. Rep. of Germany ....... 3328675

[51] Int. Cl.$^3$ ...................... B01D 53/34; C01C 17/03
[52] U.S. Cl. .................................. 423/240; 423/481; 423/488; 55/71; 55/72
[58] Field of Search ............... 423/210, 240, 481, 488; 55/71, 72

[56] References Cited

U.S. PATENT DOCUMENTS 3,690,041 9/1972 Low ........................................ 55/71
4,029,484 6/1977 Fitzpatrick ............................ 55/71

FOREIGN PATENT DOCUMENTS 2236843 4/1973 Fed. Rep. of Germany .
2702515 7/1977 Fed. Rep. of Germany .

Primary Examiner—Earl C. Thomas
Attorney, Agent, or Firm—Burns, Doane, Swecker & Mathis

[57] ABSTRACT

A process for the separation of volatile chlorine compounds from exhaust gases resulting from the chlorination of titanium-containing raw material by the treatment of the exhaust gases with an aqueous media in several stages and the absorption of the volatile chlorine compounds in the aqueous media. In the first stage, the exhaust gases are contacted with an aqueous solution of titanium oxide chloride and, in the subsequent second stage, the exhaust gases are contacted with water to obtain hydrochloric acid of useful concentration.

18 Claims, 1 Drawing Figure

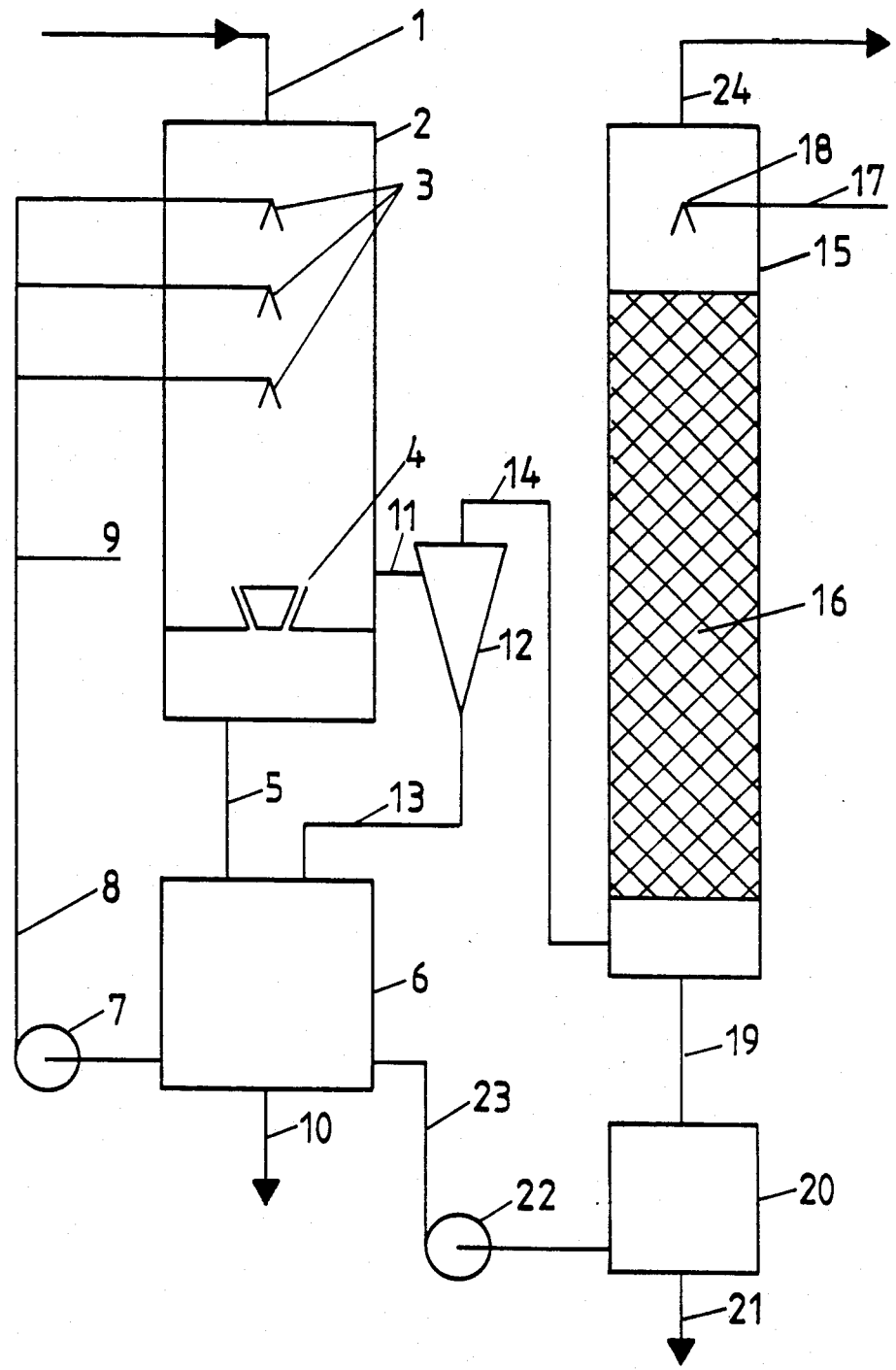

PROCESS FOR THE SEPARATION OF VOLATILE CHLORINE COMPOUNDS FROM THE EXHAUST GASES RESULTING FROM THE CHLORINATION OF TITANIUM-CONTAINING RAW MATERIALS

BACKGROUND OF THE INVENTION

1. Field of the Invention

The present invention relates to a process for the separation of volatile chlorine compounds from exhaust gases resulting from the chlorination of titanium-containing raw materials by treating the exhaust gases with aqueous media in several stages and absorbing the volatile chlorine compounds in said aqueous media.

2. Description of the Prior Art

As a consequence of the increasing severity of regulations concerning the purity of air and water and in view of the necessity to operate chemical processes as economically as possible, efforts are being made to reduce the volume of industrial wastes and to recycle any reusable waste material as a secondary raw material into the production.

In the manufacture of titanium dioxide, the process of the oxidation of titanium tetrachloride in the vapor phase ("chloride process") wherein only solid and gaseous reaction products are generated, is increasingly gaining in importance in relation to processes wherein the titanium-containing raw materials are broken down with acids whereby significant amounts of waste acids are produced, the storage and elimination thereof are difficult and expensive. Titanium tetrachloride is therefore an important initial raw material for the manufacture of titanium dioxide.

Titanium tetrachloride is produced by the chlorination of titanium-containing raw materials in the presence of a carbon-containing compound. Suitable titanium-containing raw materials are natural and synthetic rutile, titanium-containing slags or titanium-containing ores, for example ilmenite. Appropriate carbon-containing compounds are anthracite and coke, for example petroleum coke.

The raw materials are chlorinated in a finely dispersed form at elevated temperatures. In the process, the metal oxides contained in the raw materials are converted substantially completely into the corresponding metal chlorides. Following the precipitation of low volatility metal chlorides from the exhaust gases of the chlorination, the highly volatile titanium tetrachloride is condensed by cooling in a condensation stage to approximately −20° C.

Titanium-containing raw materials usually contain silica compounds. Ilmenite, for example, contains on the average up to 3% by weight $SiO_2$. In this case, the exhaust gas additionally contains a small amount of silicon tetrachloride.

The exhaust gases are entirely free of water. However, they contain a hydrochloric acid component formed by the reaction of chlorine with water contained, for example, in the initial raw material as natural humidity.

A typical composition of the exhaust gases upon leaving the condensation stage is shown in Table 1. (All gas volume data given hereafter are with reference to standard temperature and pressure).

TABLE 1

| Component | Amount (Volume %) |
| --- | --- |
| HCl | 6–9 |
| $TiCl_4$ | 0.10–0.20 |
| $SiCl_4$ | 0.01–0.20 |
| $N_2 + CO_2 + CO$ | balance |

Upon contact with water, titanium chloride is hydrolytically cleaved. When the $TiCl_4$ vapor is introduced into water, initially molecularly dispersed titanium acids are formed which "age" rapidly and pass into a dispersed colloid of titanium dioxide hydrate. This hydrolysis occurs readily upon contact of $TiCl_4$ vapor with atmospheric humidity whereby an intensely white colored smoke is generated consisting of fine, stable particles of the order of magnitude of micrometers. Such particles are absorbed during conventional washing processes with aqueous media only with considerable difficulty and even pass through multistage washing installations without alteration. Silicon tetrachloride also hydrolyzes upon contact with atmospheric humidity with the formation of smoke, but the optical density of the latter is less than that of the smoke generated during the hydrolysis of $TiCl_4$.

Exhaust gases containing $TiCl_4$ and/or $SiCl_4$ therefore must not be released into the atmosphere without further purification measures, as this would lead to the contamination of the environment.

A process for the treatment of a flow of mainly inert gases containing appreciable amounts of hydrochloric acid and titanium tetrachloride with a wash liquid on an aqueous basis is described in DE-OS No. 22 36 843. In this method, the flow of gas is treated prior to the washing process by evaporating a certain volume of water into the flow of the anhydrous mixture of gases. This amount of water, in order to safely avoid the formation of fog, must be within definite limits. It must be less than the amount required for the saturation of the flow of gas with water and larger than the volume necessary for the stoichiometric reaction with the $TiCl_4$. Furthermore, this amount of water must be evaporated into the gaseous flow at least 1/20 second before the washing process itself so that an equilibrium may be established between it and the $TiCl_4$ before the two components enter into contact with the excess volume of water in the washing process.

In the process according to DE-OS No. 27 02 515, a flow of exhaust gases containing a halide waste product, for example titanium tetrachloride, is contacted with an absorbent fog containing water in which an inorganic compound, such as for example hydrochloric acid, is dissolved while observing certain conditions of temperature, the water vapor pressure of the absorbent aqueous fog and the ratio of the surface dimensions of its particles to the weight of the waste halide to be removed.

Special installations are required for the generation of the fog, for example columns with deflecting surfaces, jet washers, spray towers or atomizers.

According to this process, in the course of the absorption of titanium tetrachloride from the flow of exhaust gas, hydrochloric acid solutions with a slight titanium content are obtained with the titanium content possibly amounting after contact with the exhaust gas according to the process of DE-OS No. 27 02 515 to approximately 2% by weight Ti, with respect to HCl.

Such titanium containing hydrochloric acid solutions are sensitive to hydrolysis and tend to precipitate turbidity of hydrated titanium oxides in case of a change in concentration, temperature and/or pH value, which renders them unsuitable for numerous industrial applications, such as for example the regeneration of ion exchangers. Such titanium-containing hydrochloric acids must therefore be purified prior to any industrial use, for example by distillation, which is expensive. In actual practice, the only acceptable solution is their neutralization and subsequent elimination.

OBJECTS OF THE INVENTION

It is the object of the present invention to develop a process for the separation of volatile chlorine compounds from the exhaust gases of the chlorination of titanium containing raw materials and for the separate recovery of the chlorine compounds in the form of industrially utilizable products, said process to be simple to effect and not subject to the detrimental restrictions of the known processes.

BRIEF DESCRIPTION OF THE DRAWING

The drawing shows a schematic representation of an embodiment of the present invention wherein volatile chlorine compounds are separated from exhaust gases resulting from the chlorination of titanium-containing raw material.

DETAILED DESCRIPTION OF THE INVENTION

The object of the present invention is attained by the development of a process for the separation of volatile chlorine compounds from exhaust gases of the chlorination of titanium-containing raw materials by treating the exhaust gases with aqueous media in several stages and the absorption of the volatile chlorine compounds in said aqueous media.

The process is characterized in that:

(a) the exhaust gases are treated in a first absorption stage with an aqueous solution of titanium oxide chloride, the concentration thereof, calculated as titanium dioxide, amounting to between 100 and 170 grams $TiO_2$ per liter and (b) subsequently, the exhaust gases are treated in a second absorption stage with water in a volume that is adequate to absorb the hydrogen chloride and convert it to hydrochloric acid with a concentration of 27 to 32% by weight HCl.

Aqueous solutions of titanium oxide chloride in the concentration range of 100 to 170 g $TiO_2/1$ claimed according to Stage (a) are stable in storage and have numerous industrial applications, for example as the initial solution for the preparation of $TiO_2$ pigments, for the stabilization of inorganic pigments, the preparation of crystallization nuclei for the precipitation of hydrated titanium dioxide according to different processes and the flame-proofing of textiles.

The concentrated hydrochloric acid obtained in Stage (b) is universally applicable in industry.

The main portion of the titanium tetrachloride and, if silica-containing initial raw materials are used, of silicon tetrachloride, is condensed by the cooling of the exhaust gases to −20° C. and separation therefrom. However, a small proportion of both chlorides is passed together with the other components of the exhaust gas into the cooling installation as a function of their vapor pressure at −20° C. According to the invention, the flow of exhaust gases then enters an absorption installation, for example a conventional absorption tower and is contacted therein with the titanium oxide chloride solution, the concentration thereof, calculated as titanium dioxide, amounting to between 100 and 170 g $TiO_2/1$.

The term "titanium oxide chloride solution" is not intended herein to represent the solution of stoichiometric $TiOCl_2$ compound, but rather an aqueous solution containing dissolved titanium and hydrochloric acid characterized by its $TiO_2$ content, with the determination of the actual presence of the numerous possible hydrolysis products remaining unresolved.

The titanium oxide chloride solution enters the absorption installation through spray nozzles and is placed into contact in co-current or counter-current flow with the exhaust gases containing the volatile chlorine compounds. The absorption is enhanced by the supplemental application of a liquid distributor, for example an annular gap washer.

The amount of the dissolved titanium oxide chloride in contact in the first absorption stage with the exhaust gas is, calculated as titanium dioxide in the range of from 250 to 510 g $TiO_2$ /$m^3$ of exhaust gas.

Initially, titanium tetrachloride and hydrogen chloride dissolve in the aqueous titanium oxide chloride solution until an equilibrium is established which depends on the concentration of the two substances in the solution and in the exhaust gas and on the temperature and pressure. With a concentration of the titanium oxide chloride solution, calculated as titanium dioxide, of 100 g $TiO_2/1$, an equilibrium concentration of hydrogen chloride amounting to 320 g HCl/1 solution is established, while a concentration of 280 g HCl/1 corresponds to a titanium oxide chloride concentration of 170 g $TiO_2/1$. These values are valid for a temperature of 20° C. and a pressure of 1 bar.

In the first absorption stage, titanium tetrachloride is absorbed essentially completely from the titanium oxide chloride solution and is separated from the exhaust gases. This is surprising, as both in the concentration range of the titanium oxide chloride solution of less than 100 g $TiO_2/1$, as in the range over 170 g $TiO_2/1$, the absorption of titanium tetrachloride decreases. As mentioned above, titanium oxide chloride solutions containing less than 100 g $TiO_2/1$ have limited applicability.

An essential characteristic of the present invention consists of the fact that the process may be operated continuously and that it is possible to absorb the $TiCl_4$ contained in the exhaust gases practially completely in a concentrated, industrially utilizable titanium oxide chloride solution, while the usefulness of the solution is assured at all times in view of its constant concentration.

To absorb the $TiCl_4$ in the first absorption stage, the titanium oxide chloride solution is contacted with the exhaust gases in the form of liquid droplets, preferably in a size range of 0.3 to 1.0 mm, and the mixture thus produced is passed through a washing installation. The spraying of the titanium oxide chloride solution to generate a liquid fog in a particle size range of micrometers would be energy intensive and is not necessary. On the other hand, the presence of such a liquid fog does not prevent the complete absorption of the $TiCl_4$ according to the process of the invention. An annular gap washer is used advantageously in the first absorption stage.

The titanium oxide chloride solution is circulated in the first absorption stage and its concentration is maintained constant by the addition of water or hydrochloric acid. In this manner, a hydrochloric acid concentration corresponding to a certain $TiO_2$ concentration is always present. The absorption of hydrogen chloride may take place adiabatically or isothermally. Adiabatic absorption involves lower operating and equipment costs and is therefore preferable.

A preferred embodiment of the process consists of the hydrochloric acid formed in the second absorption stage having a concentration of 29 to 30% by weight HCl and being practially free of impurities.

If silica-containing initial materials are used, only part of the silicon tetrachloride formed in the course of chlorination dissolves in the titanium oxide chloride solution of the first absorption stage, which thereby is able to absorb silica to a concentration of 1 to 2 g $SiO_2/l$, which does not affect its industrial application since in the manufacture of $TiO_2$ pigments silicon-containing additives are frequently used intentionally. The silicon tetrachloride is absorbed essentially in the second absorption stage by treating the exhaust gases with the aqueous hydrochloric acid solution and converting it to hydrated silicon dioxide. The proportion precipitated in the second absorption stage amounts to, calculated as $SiO_2$, 75 to 80% of the initial quantity of $SiO_2$.

The hydrated silicon dioxide passes into an insoluble, grainy, readily filterable form under the effect of the hydrochloric acid after a retention time of approximately two days. The hydrated silicon dioxide is then separated from the hydrochloric acid by filtering.

The residual gases exhausted from the second absorption stage contain no more volatile chlorine compounds in normal operation. They may be passed for safety reasons through a further, successive absorption installation and therein contacted in a manner known in itself with an alkaline solution, for example sodium hydroxide or a reducing solution, for example an aqueous solution of sodium thiosulfate, in order to remove any chlorine that may be contained in the exhaust gas as the result of operating deficiencies.

The residual gases, which now consist of nitrogen and carbon oxides, are for the most part combustible and may be freed of carbon monoxide by burning in air.

The invention will become more apparent from the description below with reference to the figure:

The flow of exhaust gases coming from the cooling installation enters the absorption installation 2 (first absorption stage) through the line 1 with a titanium oxide chloride solution being introduced into said installation 2 by means of spray nozzles 3. In the absorption installation 2 and in the washer 4 the absorption of titanium tetrachloride in the titanium oxide chloride solution is effected. The latter is drained through the line 5 into the reservoir 6 and from there returned to the spray nozzles 3 through the pump 7 and the line 8. By means of the line 9, water or hydrochloric acid may be added to this circulation and the titanium oxide chloride solution may be drained from the reservoir by means of the line 10. The exhaust gases escaping through the line 11 arrive in the mist collector 12, from which the liquid precipitated returns through the line 13 into the reservoir 6. Through the line 14 the exhaust gases pass into the absorption installation 15 filled with filler bodies 16 (second absorption stage) into which water is introduced through the line 17 and the spray nozzle 18. The concentrated hydrochloric acid formed is drained by means of the line 19 into the storage reservoir 20 and may be drained through the line 21, passed to filtration or pumped back by the pump 22 through the line 23 partially into the reservoir 6. The residual gases free of volatile, chlorine-containing compounds leave the absorption installation 15 through the line 24.

The invention shall be explained by Examples 1 to 5 in more detail:

In all of the Examples, a cylindrical vessel with an inner diameter of 0.15 m and an outside height of 1.00 m serves as the absorption installation 2. The feeding of the titanium oxide chloride solution into the absorption installation is effected by 3 spray nozzles and in the lower part of the installation a washing device in the form of an annular gap washer is located wherein the gas flow velocity amounts to 60 m/s. The absorption installation 15 consists in each case of an absorption column, filled with Raschig rings with the dimensions of 0.02×0.02 m (shaded in the figure), said column having an inner diameter of 0.1 m and an outside height of 4.0 m.

The exhaust gases have the following composition (in volume %):

HCl = 90
$TiCl_4$ = 0.15
$SiCl_4$ = 0.018
$N_2 + CO_2 + CO$ = balance

Details are summarized in Table 2.

TABLE 2

|  | Example Number | | | | |
| --- | --- | --- | --- | --- | --- |
|  | 1 | 2 | 3 | 4 | 5 |
|  |  |  |  | (Comparative Examples) | |
| Volume of exhaust gas ($m^3/h$) | 30 | 30 | 30 | 30 | 30 |
| Composition of the titanium oxide chloride solution (g/l) |  |  |  |  |  |
| $TiO_2$ | 150 | 120 | 180 | 30 | 150 |
| HCl | 279 | 320 | 270 | 374 | 279 |
| $H_2O$ | 768 | 758 | 761 | 774 | 768 |
| Volume of recycled titanium chloride solution (l/h) | 90 | 90 | 90 | 90 | 45 |
| Amount of titanium oxide chloride in contact with the exhaust gas (as g $TiO_2/m^3$) | 450 | 360 | 540 | 90 | 225 |
| $TiCl_4$ absorbed by the titanium oxide chloride solution with respect to the initial amount (%) | 99.7 | 99.8 | 88.3 | 98.0 | 92.0 |
| Volume of titanium oxide chloride solution drained from the washer (l/h) | 1.05 | 1.32 | 0.78 | 5.33 | 0.98 |
| Amount of the 30% by weight hydrochloric acid obtained (kg/h) | 13.4 | 12.9 | 13.6 | 7.9 | 13.4 |
| $TiO_2$ content of the 30% by weight hydrochloric acid (g/l) | 0.03 | 0.03 | 0.22 | 0.10 | 0.18 |
| Appearance of the exhaust gas | clear | clear | heavy smoke | heavy smoke | heavy smoke |

Examples 1 and 2 show that by the use of a titanium oxide chloride solution with the concentration of 100 to 170 g $TiO_2/l$ claimed herein in the first absorption stage, a practically complete absorption of the titanum tetrachloride from the exhaust gases is obtained and in the second absorption stage a 30% by weight hydrochloric acid is obtained which is almost free of titanium, while the exhaust gas (residual gas) is clear and enters the atmosphere without smoke.

If, on the other hand, the concentration of the titanium oxide chloride solution is too high (Comparative Example 3) or too low (Comparative Example 4), or the concentration of the titanium oxide chloride solution is optimal but the recycled volume and thus the proportion in contact with the waste gases is too low (Comparative Example 5), the amount of TiCl$_4$ absorbed by the titanium oxide chloride solution and the purity of the concentrated hydrochloric acid decreases and the exhaust gases form a dense smoke.

The invention being thus described and exemplified, it will be obvious that the invention may be varied in many ways. Such variation are not to be regarded as a departure from the spirit and scope of the invention and all such modifications are intended to be included within the scope of the following claims.

I claim:

1. A process for the separation of volatile chlorine compounds from the exhaust gases resulting from the chlorination of titanium-containing raw materials comprising:
   (a) contacting the exhaust gases in a first absorption stage with an aqueous solution of titanium oxide chloride having a concentration, calculated as titanium dioxide, in the range of from 100 to 170 g TiO$_2$/1; and
   (b) subsequently contacting the exhaust gases in a second absorption stage with water in a volume adequate to absorb hydrogen chloride and convert it into hydrochloric acid having a concentration of 27 to 32% by weight HCl.

2. The process according to claim 1 wherein the amount of the dissolved titanium oxide chloride in contact with the exhaust gas in the first absorption stage, calculated as titanium dioxide, is in the range of from 250 to 510 g TiO$_2$/m$^3$ of exhaust gas.

3. The process according to claim 2 wherein in the first absorption stage, titanium tetrachloride in the exhaust gases is substantially completely absorbed by the titanium oxide chloride solution and is separated from the exhaust gases.

4. The process according to claim 1 wherein in the first absorption stage, titanium tetrachloride in the exhaust gases is substantially completely absorbed by the titanium oxide chloride solution and is separated from the exhaust gases.

5. The process according to claim 4 wherein in the first absorption stage the titanium oxide chloride solution is contacted with the exhaust gases in the form of liquid droplets having a size range of 0.3 to 1.0 mm and the resulting mixture is passed through a washing installation.

6. The process according to claim 3 wherein in the first absorption stage the titanium oxide chloride solution is contacted with the exhaust gases in the form of liquid droplets having a size range of 0.3 to 1.0 mm and the resulting mixture is passed through a washing installation.

7. The process according to claim 2 wherein in the first absorption stage the titanium oxide chloride solution is contacted with the exhaust gases in the form of liquid droplets having a size range of 0.3 to 1.0 mm and the resulting mixture is passed through a washing installation.

8. The process according to claim 1 wherein in the first absorption stage the titanium oxide chloride solution is contacted with the exhaust gases in the form of liquid droplets having a size range of 0.3 to 1.0 mm and the resulting mixture is passed through a washing installation.

9. The process according to claim 8 wherein the titanium oxide chloride solution is circulated in the first absorption stage and the concentration thereof is maintained constant by the addition of water or hydrochloric acid.

10. The process according to claim 6 wherein the titanium oxide chloride solution is circulated in the first absorption stage and the concentration thereof is maintained constant by the addition of water or hydrochloric acid.

11. The process according to claim 1 wherein the titanium oxide chloride solution is circulated in the first absorption stage and the concentration thereof is maintained constant by the addition of water or hydrochloric acid.

12. The process according to claim 1 wherein the concentration of the hydrochloric acid formed in the second absorption stage is in the range of 29 to 30% by weight HCl.

13. The process according to claim 12 wherein the exhaust gases contain silicon tetrachloride which is substantially absorbed in the second absorption stage by treating the exhaust gases with an aqueous hydrochloric acid solution and which is converted into hydrated silicon dioxide.

14. The process according to claim 10 wherein the exhaust gases contain silicon tetrachloride which is substantially absorbed in the second absorption stage by treating the exhaust gases with an aqueous hydrochloric acid solution and which is converted into hydrated silicon dioxide.

15. The process according to claim 1 wherein the exhaust gases contain silicon tetrachloride which is substantially absorbed in the second absorption stage by treating the exhaust gases with an aqueous hydrochloric acid solution and which is converted into hydrated silicon dioxide.

16. The process according to claim 15 wherein the hydrated silicon dioxide is separated by filtration from the hydrochloric acid.

17. The process according to claim 14 wherein the hydrated silicon dioxide is separated by filtration from the hydrochloric acid.

18. The process according to claim 13 wherein the hydrated silicon dioxide is separated by filtration from the hydrochloric acid.

* * * * *